(12) United States Patent
Madrid (10) Patent No.: US 11,379,157 B2
(45) Date of Patent: Jul. 5, 2022

(54) DYNAMIC RANDOM ACCESS MEMORY (DRAM) BANDWIDTH INCREASE WITHOUT PER PIN BANDWIDTH INCREASE

(71) Applicant: Samsung Electronics Co., Ltd., Suwon-si (KR)

(72) Inventor: Philip Enrique Madrid, Austin, TX (US)

(73) Assignee: SAMSUNG ELECTRONICS CO., LTD.

( * ) Notice: Subject to any disclaimer, the term of this patent is extended or adjusted under 35 U.S.C. 154(b) by 0 days.

(21) Appl. No.: 17/080,832

(22) Filed: Oct. 26, 2020

(65) Prior Publication Data

US 2022/0011972 A1 Jan. 13, 2022

Related U.S. Application Data (60) Provisional application No. 63/050,745, filed on Jul. 10, 2020.

(51) Int. Cl.
*G06F 3/06* (2006.01)
*G06F 13/16* (2006.01)

(52) U.S. Cl.
CPC ............ *G06F 3/0659* (2013.01); *G06F 3/061* (2013.01); *G06F 3/0673* (2013.01); *G06F 13/1668* (2013.01); *G06F 2213/16* (2013.01)

(58) Field of Classification Search
CPC .................................................... G06F 3/0659
See application file for complete search history.

(56) References Cited

U.S. PATENT DOCUMENTS

| 7,062,587 | B2 | 6/2006 | Zaidi et al. |
| 7,260,015 | B2 | 8/2007 | Jeddeloh |
| 9,654,146 | B2 * | 5/2017 | Chen ....................... G06F 11/10 |
| 9,728,236 | B1 | 8/2017 | Sankaranarayanan et al. |
| 9,996,104 | B2 | 6/2018 | Huang |
| 2002/0023191 | A1 | 2/2002 | Fudeyasu |
| 2006/0233027 | A1 | 10/2006 | Huang |
| 2007/0028027 | A1 | 2/2007 | Janzen et al. |
| 2008/0201620 | A1 * | 8/2008 | Gollub ................ G06F 11/1044 714/718 |
| 2013/0054884 | A1 | 2/2013 | Gupta et al. |
| 2013/0326132 | A1 | 12/2013 | Jeddeloh |

* cited by examiner

*Primary Examiner* — Tammara R Peyton
(74) *Attorney, Agent, or Firm* — Renaissance IP Law Group LLP (57) ABSTRACT

A dynamic random access memory (DRAM) includes first and second data buses, and first and second command and address (C/A) buses. The first data bus conveys a write data to the DRAM. The second data bus conveys read data from the DRAM. The first and second C/A buses are respectively associated with the first and second data buses. In one embodiment, the first data bus conveys the write data to a first bank of memory of the DRAM simultaneously as the second data bus conveys the read data from a second bank of memory of the DRAM. In another embodiment, the first data bus conveys the write data to a first rank of memory of the DRAM simultaneously as the second data bus conveys read data from a second rank of memory of the DRAM.

18 Claims, 5 Drawing Sheets

DYNAMIC RANDOM ACCESS MEMORY (DRAM) BANDWIDTH INCREASE WITHOUT PER PIN BANDWIDTH INCREASE

CROSS-REFERENCE TO RELATED APPLICATION

This application claims the priority benefit under 35 U.S.C. § 119(e) of U.S. Provisional Application No. 63/050,745, filed on Jul. 10, 2020, the disclosure of which is incorporated herein by reference in its entirety.

TECHNICAL FIELD

The subject matter disclosed herein relates to systems on a chip (SOCs). More particularly, the subject matter disclosed herein relates to a technique for increasing bandwidth of Dynamic Random Access memories (DRAMs) in an SOC.

BACKGROUND

Many non-DRAM (dynamic random access memory) interfaces use unidirectional data buses instead of bidirectional data buses. The DRAMs, however, use bidirectional data buses. Some older DRAM protocols (e.g., Fully Buffered Dual In-line Memory Module (FBDIMM)) use high-speed unidirectional interfaces to bridge chips, which then communicate with DRAMs using a bidirectional interface. DRAMS do not support unidirectional data buses.

SUMMARY

An example embodiment provides a dynamic random access memory (DRAM) that may include a first data bus, a first command and address bus, a second data bus, and a second command and data bus. The first data bus may convey a first type of data in a first direction with respect to the DRAM. The first command and address bus may be associated with the first data bus. The second data bus may convey a second type of data in a second direction with respect to the DRAM. The second command and address bus may be associated with the second data bus. In one embodiment, the first type of data may be write data and the first direction with respect to the DRAM may be toward the DRAM, and the second type of data may be read data and second direction with respect to the DRAM may be away from the DRAM. In another embodiment, the DRAM may further include a first bank of memory and a second bank of memory. The first data bus may include a first unidirectional bus and the second data bus may include a second unidirectional bus, and the first data bus may convey the first type of data with respect to the first bank of memory simultaneously as the second data bus may convey the second type of data with respect to the second bank of memory. In still another embodiment, the DRAM may further include a first rank of memory and a second rank of memory, and the first data bus may convey the first type of data with respect to the first rank of memory simultaneously as the second data bus may convey the second type of data with respect to the second rank of memory.

An example embodiment provides a dynamic random access memory (DRAM) that may include a first rank of memory, a second rank of memory, a first data bus and a second data bus. The first data bus may convey a first type of data in a first direction with respect to the first rank of memory. The second data bus may convey a second type of data in a second direction with respect to the second rank of memory. The first data bus may convey the first type of data with respect to the first rank of memory simultaneously as the second data bus may convey the second type of data with respect to the second rank of memory. In one embodiment, a first command and address bus may be associated with the first data bus, and a second command and address bus may be associated with the second data bus.

An example embodiment provides a dynamic random access memory (DRAM) that may include a first bank of memory, a second bank of memory, a first data bus, a first command and address bus, a second data bus, and a second command and address bus. The first data bus may convey a first type of data in a first direction with respect to the DRAM. The first command and address bus may be associated with the first data bus. The second data bus may convey a second type of data in a second direction with respect to the DRAM. The second command and address bus may be associated with the second data bus. The first data bus may convey the first type of data with respect to the first bank of memory simultaneously as the second data bus may convey the second type of data with respect to the second bank of memory. In one embodiment, the first type of data may be write data and the first direction with respect to the DRAM may be toward the DRAM, and the second type of data may be read data and second direction with respect to the DRAM may be away from the DRAM.

BRIEF DESCRIPTION OF THE DRAWING

In the following section, the aspects of the subject matter disclosed herein will be described with reference to exemplary embodiments illustrated in the figure, in which.

DETAILED DESCRIPTION

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-chip (SoC), an assembly, and so forth.

A current focus of SoCs is to deliver a higher memory bandwidth performance at a higher power efficiency. Increasing frames per second (fps) on workloads like Manhattan entails both high theoretical memory system bandwidth, as well as high utilization. In part, the increased bandwidth has been traditionally delivered by increasing Low Power Double Data Rate 5 (LPDDR5) data rates. In some SoCs, eight channels of DRAM are required to deliver sufficient memory system bandwidth.

Currently, DRAM devices include one command/address bus and one bidirectional data bus. DRAM devices may be following an evolutionary path to increase bandwidth that may encounter difficulties. Generally, DRAM bandwidth has been increased in large part by typically pushing the DRAMs to higher and higher bit rates. A typical approach to increase the bandwidth of the bidirectional bus has involved elaborate I/O techniques to obtain a bandwidth improvement with good signal integrity. Increasing DRAM bandwidth by pushing higher and higher bit rates, however, may be increasingly difficult and expensive for a multi-drop bidirectional bus, such as that used in an SoC. Accordingly, DRAM bidirectional buses may be limiting factor because it may be hard for bidirectional buses to run fast, and there may be read/write simultaneity and bus turnaround issues with bidirectional buses because read operations in traditional DRAMS must wait for write operations to complete, and write operations must wait for read operations to complete.

Figure 1:
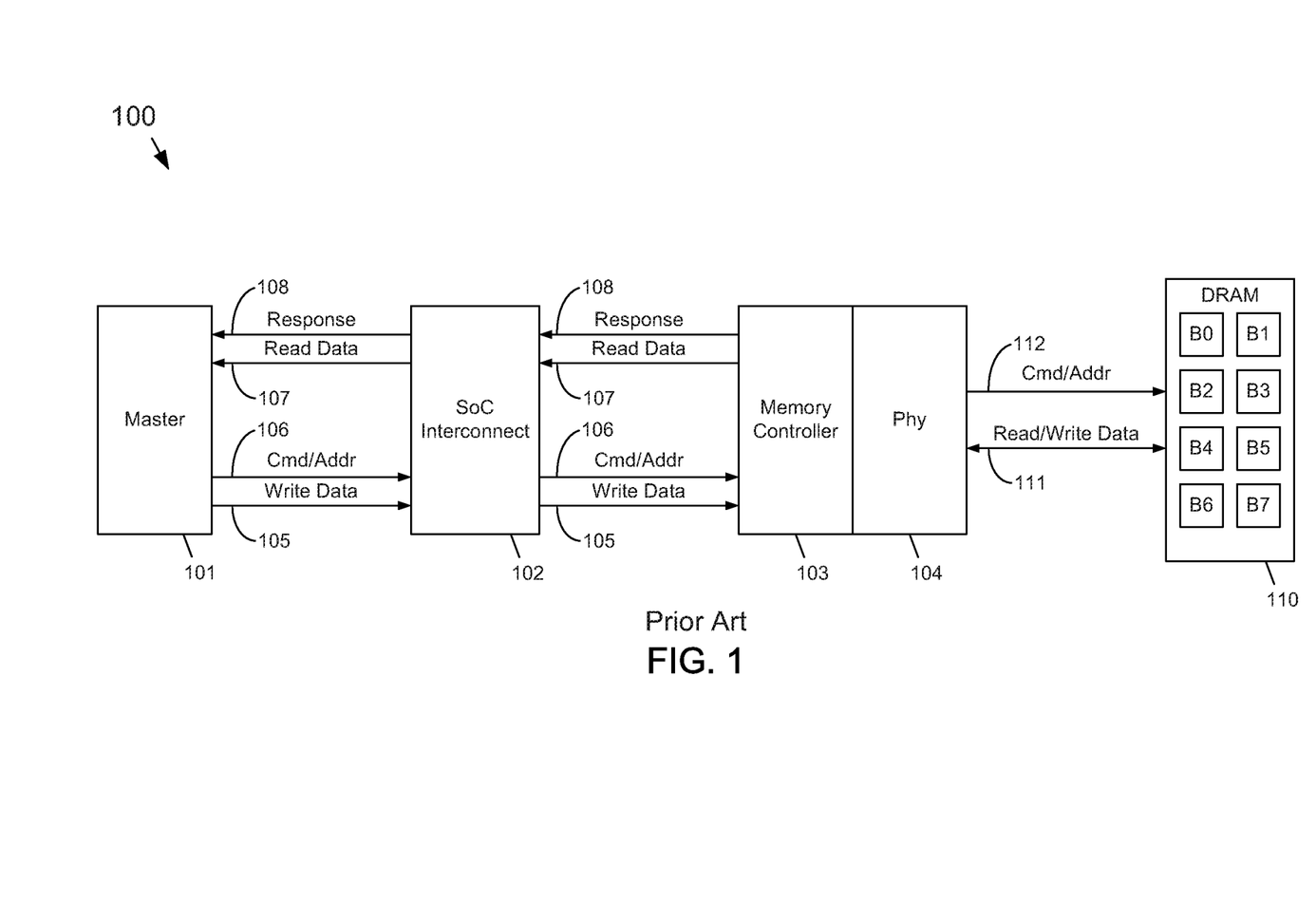
FIG. 1 depicts a block diagram of an SoC that connects to a DRAM memory in a traditional manner.

FIG. 1 depicts a block diagram of an SoC 100 that connects to a DRAM memory in a traditional manner. The SoC 100 includes a master device 101, such as, but not limited to, a central processing unit (CPU) or a graphic processing unit (GPU), an SoC interconnect 102, a memory controller 103 and, if the SoC 100 is a Peripheral Component Interconnect Express (PCIe) based system, a physical layer (PHY) 104. The SoC 100 may also include Input/Output (IO) masters (not shown) such as, but not limited to, a display, a camera and/or a modem. Although FIG. 1 shows only one SoC interconnect 102, it should be understood that the SoC 100 may include any number of SoC interconnects 102.

Data communications within the SoC 100 are through dedicated unidirectional data buses. A request command/address (Cmd/Addr) bus 106 may carry, or convey, request command and address information to a destination device. A response bus 108 may carry, or convey, response information to the master device 101. For example, the master device 101 may send write data to a destination device, such as a memory, using a unidirectional data bus 105. A request command/address bus 106 may be associated with the data bus 105, and may convey request command and address information to the memory. The master device 101 may also receive read data from a source device, such as a memory, using a unidirectional data bus 107. A response bus 108 may be associated with the read data bus 107, and may convey response information from the memory to the master device 101. Together the data buses, the request command/address buses and the response buses form a communication fabric, or network, throughout the SoC 100.

The physical layer 104 may be connected to a DRAM 110 that is external to the communication fabric of the SoC 100. The DRAM 110 may, for example, include a plurality of banks B0-B7. The physical layer 104, for example, receives write data over the unidirectional data bus 105, and sends the write data to the DRAM 110 over a bidirectional data bus 111. The data bus 111 is a bidirectional data bus because traditional DRAMs use bidirectional buses, and do not support unidirectional data buses. Commands and address information are sent from the physical layer 104 to the DRAM 110 over a unidirectional request command/address bus 112. Read data that is sent from the DRAM 110 to the master device 101 is first sent over the bidirectional data bus 111 to the physical layer 104. The physical layer 104 sends the read data to the master device 101 over a unidirectional data bus 107.

To improve the bandwidth of a DRAM, the subject matter disclosed herein provides separate unidirectional data buses for reads and writes to a DRAM, which may allow read and write operations to be performed simultaneously. One embodiment of the subject matter disclosed herein provides a DRAM device that includes two command/address buses (one for read operations and one for write operations), and two unidirectional data buses, one from a DRAM device to an SoC for read operations and one from the SoC to the DRAM for write operations. Consequently, a bandwidth advantage may be realized by the subject matter disclosed herein for any workload that does both reads and writes. In one embodiment, the subject matter disclosed herein includes some additional interface pins to a DRAM.

The subject matter disclosed herein provides are two approaches to increase the bandwidth of a DRAM. A first approach adds pins to both the DRAM package and DRAM die, and a second approach only adds pins to the DRAM package. As used herein, changes to a DRAM package relate to changes to DRAM packages for an LPDDR4 or an LPDDR5 package or changes to a DIMM for DDR devices, such as but not limited to DDR4 or DDR5 devices. While the first approach may provide an improved performance solution in comparison to the second approach, both approaches may provide an improved performance solution.

Figure 2:
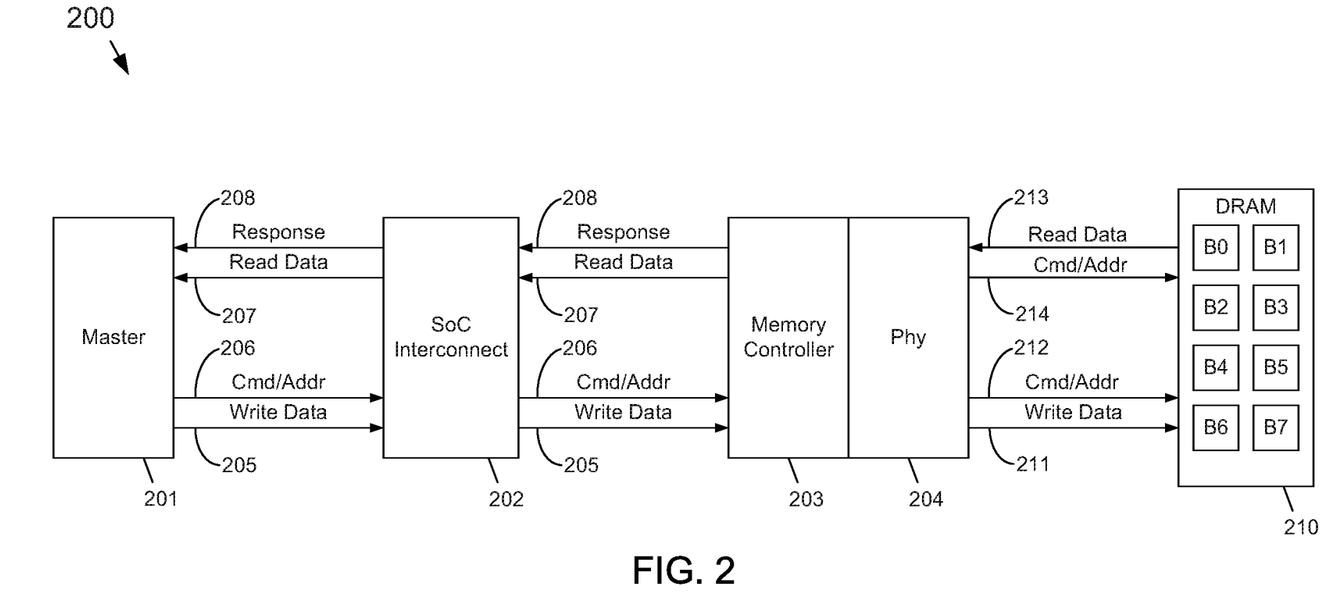
FIG. 2 depicts a block diagram of an example embodiment of an SoC that connects to a DRAM memory using two unidirectional data buses according to the subject matter disclosed herein.

FIG. 2 depicts a block diagram of an example embodiment of an SoC 200 that connects to a DRAM memory using two unidirectional data buses according to the subject matter disclosed herein. The SoC 200 includes a master device 201, such as, but not limited to, a CPU or a GPU, an SoC interconnect 202, a memory controller 203 and, if the SoC 200 is a PCIe based system, a physical layer (PHY) 204. The SoC 200 may also include IO masters (not shown) such as, but not limited to, a display, a camera and/or a modem. Although FIG. 2 shows only one SoC interconnect 202, it should be understood that the SoC 200 may include any number of SoC interconnects 202.

Data communications within the SoC 200 are through dedicated unidirectional data buses. A request command/address (Cmd/Addr) bus 206 may carry, or convey, request command and address information to a destination device. A response bus 208 may carry, or convey, response information to the master device 201. For example, the master device 201 may send write data to a destination device, such as a memory, using a unidirectional data bus 205. A request command/address bus 206 may be associated with the data bus 205, and may convey request command and address information to the memory. The master device 201 may also receive read data from a source device, such as a memory, using a unidirectional data bus 207. A response bus 208 may be associated with the read data bus 207, and may convey response information from the memory to the master device 201. In one embodiment, the response bus 208 may not be strictly associated with the read data bus 207, and may be associated with the write data bus 205. Together the data buses, the request command/address buses and the response buses form a communication fabric, or network, throughout the SoC 200.

The physical layer 204 may connect to a DRAM 210 that is external to communication fabric of the SoC 200. The DRAM 210 may, for example, include a plurality of banks B0-B7. In some embodiments, the DRAM 210 may include eight banks B0-BV7, whereas in other embodiments, the DRAM 210 may include 16 banks. In other embodiments, the DRAM 210 may include 16 banks in a bank group concept in which the 16 banks are grouped in sets of four in four different bank groups. For DRAMs that include/support a bank group mode, the simultaneity provided by the subject matter disclosed herein relates to a simultaneity to different bank groups.

The physical layer 204, for example, may receive write data over the unidirectional data bus 205, and send the write data to the DRAM 210 over a unidirectional data bus 211. Write commands and write address information are sent from the physical layer 204 to the DRAM 211 over a unidirectional request command/address bus 212. Read data that is sent from the DRAM 210 to the master device 201 is sent over a unidirectional data bus 213 to the physical layer 204. Read commands and read address information are sent from the physical layer 204 to the DRAM 214 over a unidirectional request command/address bus 214. The physical layer 204 sends the read data and responses to the master device 201 respectively over a unidirectional data bus 207 and a response bus 208.

The first approach of the subject matter disclosed herein, depicted in FIG. 2, involves changing the DRAM from a DRAM that uses a single bidirectional bus to a DRAM that uses a dedicated unidirectional write data bus (bus 211), a dedicated unidirectional read data bus (bus 213), and a second command/address bus (req command/address bus 214). Based on this first approach, a single memory controller may write and read different banks (bank groups) of a DRAM simultaneously. The first approach also involves adding some additional pins to a DRAM die and to a DRAM package, along with increasing the power-delivery system to handle greater peak power loads and some logic changes that support a second cmd/address port.

The first approach may add, for example, approximately 22-25 pins per DRAM channel (plus additional power/ground) to the package and also to the DRAM chip. With this approach, there would no longer be any read/write turnaround penalties. The theoretical maximum bandwidth may double without a change to the on-chip DRAM array. The pin bandwidth may not need to increase (even if the pin bandwidth does increase), thereby easing any further complexity of the IO design and avoiding signal integrity problems that arise from pushing per pin bandwidth on bidirectional, multi-load buses.

For the second approach, the DRAM package (such as a DIMM) would include the addition of a second bidirectional data bus so that each of two ranks would have a dedicated bidirectional data bus and its own command/address bus.

Figure 3:
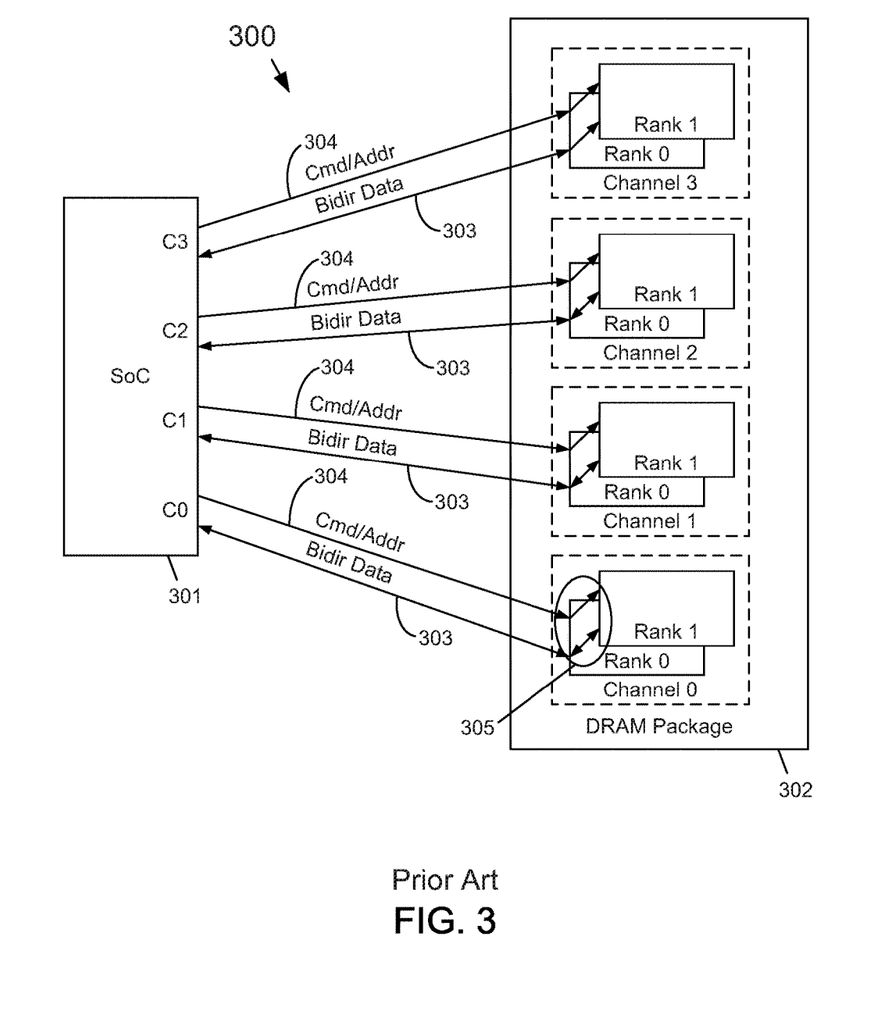
FIG. 3 depicts a block diagram of a traditional SOC connection to a DRAM package, such as a DIMM.

As a baseline, FIG. 3 depicts a block diagram of a traditional SOC connection 300 to a DRAM package, such as a DIMM 301. Each channel C0-C3 of an SOC 301 connects to a DRAM 302 package through a bidirectional data bus 303 and a command and address (Cmd/Addr) bus 304. Each channel of the DRAM package 302 may include a ranks 0 and 1. Each rank may contain a plurality of banks. The ranks 0 and 1 of each respective channel within the DRAM package 302 are connected at 305 to the corresponding bidirectional data bus and Cmd/Addr bus for the channel.

Figure 4:
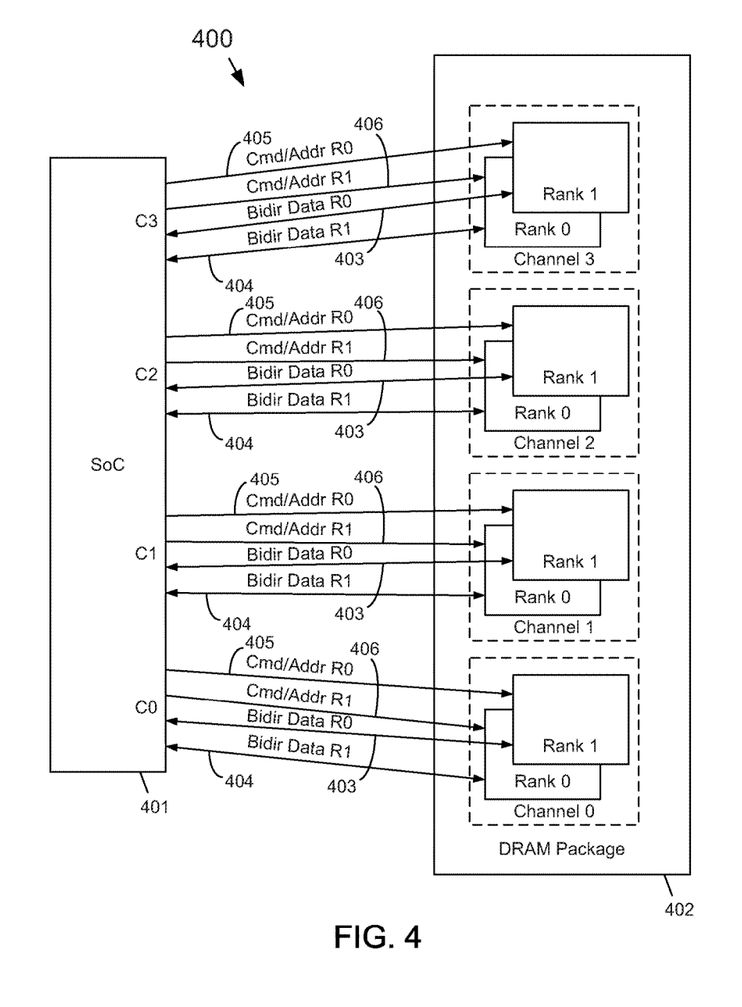
FIG. 4 depicts a block diagram of an example embodiment of a SOC connection to a DRAM package according to the subject matter disclosed herein.

In contrast to the traditional approach depicted in FIG. 3, FIG. 4 depicts a block diagram of an example embodiment of a SOC connection 400 to a DRAM package according to the subject matter disclosed herein. Each channel C0-C3 of an SOC 401 connects to a DRAM package 402 through bidirectional data buses 403 and 404, and through command and address (Cmd/Addr) buses 405 and 406. Each channel of the DRAM package 402 may include ranks 0 and 1. The rank 0 of a channel is connected to the SoC 401 through a bidirectional data bus 403 and through a Cmd/Addr bus 405. Similarly, the rank 1 of a channel is connected to the SoC 401 through a bidirectional data bus 404 and through a Cmd/Addr bus 406. Although the second approach is based on a two-rank system, it should be understood that a memory system having more than two ranks may be contemplated.

The second approach depicted in FIG. 4 may allow reads and writes to proceed independently provided the reads and writes are to different ranks rather than to banks/bank groups as in the first approach of FIG. 2. The second approach may not provide as large an increase in bandwidth as the first approach, but still allows for some read/write parallelism that may not be possible in traditional memory systems.

For the second approach, the DRAM chip itself does not change. Only the DRAM package changes by adding additional pins for the additional command/address/data buses. In one embodiment, approximately, 22-25 pins per DRAM channel (plus additional power/ground) would be added to an LPDDR DRAM package. It should be noted that the pins for the 22-25 pins per DRAM increase estimate relate to functional and logic pins, and power and ground pins.

Increasing per pin bandwidth of a DRAM may still help read and write bandwidth, so there may be nothing preventing a continued pursuit of higher data rates, but it is expected that utilizing the subject matter disclosed herein may be superior for memory-system-intensive workloads, such as MemCpy and MemBW.

Figure 5:
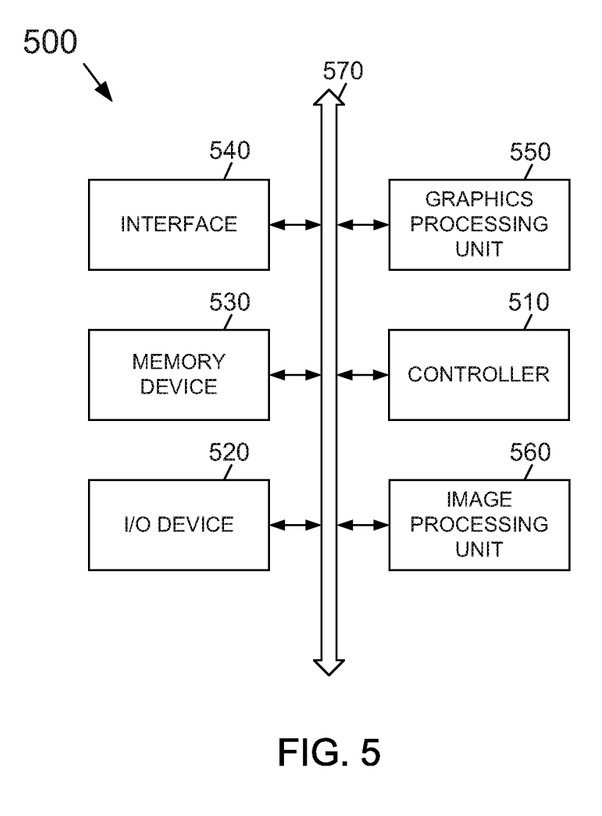
FIG. 5 depicts an electronic device that includes a DRAM device that uses two unidirectional buses to interface with the DRAM according to the subject matter disclosed herein.

FIG. 5 depicts an electronic device 500 that includes a DRAM device that uses two unidirectional buses to interface with the DRAM according to the subject matter disclosed herein. Electronic device 500 may be used in, but not limited to, a computing device, a personal digital assistant (PDA), a laptop computer, a mobile computer, a web tablet, a wireless phone, a cell phone, a smart phone, a digital music player, or a wireline or wireless electronic device. The electronic device 500 may include a controller 510, an input/output device 520 such as, but not limited to, a keypad, a keyboard, a display, a touch-screen display, a camera, and/or an image sensor, a memory 530, an interface 540, a GPU 550, and an imaging-processing unit 560 that are coupled to each other through a bus 570. The memory 530 may include a DRAM device that uses two unidirectional buses to interface with the DRAM according to the subject matter disclosed herein. The controller 510 may include, for example, at least one microprocessor, at least one digital signal processor, at least one microcontroller, or the like. The memory 530 may be configured to store a command code to be used by the controller 510 or a user data.

Electronic device 500 and the various system components of electronic device 500 may include the image processing unit 560. The interface 540 may be configured to include a wireless interface that is configured to transmit data to or receive data from a wireless communication network using a RF signal. The wireless interface 540 may include, for example, an antenna. The electronic system 500 also may be used in a communication interface protocol of a communication system, such as, but not limited to, Code Division Multiple Access (CDMA), Global System for Mobile Communications (GSM), North American Digital Communications (NADC), Extended Time Division Multiple Access (E-TDMA), Wideband CDMA (WCDMA), CDMA2000, Wi-Fi, Municipal Wi-Fi (Muni Wi-Fi), Bluetooth, Digital Enhanced Cordless Telecommunications (DECT), Wireless Universal Serial Bus (Wireless USB), Fast low-latency access with seamless handoff Orthogonal Frequency Division Multiplexing (Flash-OFDM), IEEE 802.20, General Packet Radio Service (GPRS), iBurst, Wireless Broadband (WiBro), WiMAX, WiMAX-Advanced, Universal Mobile Telecommunication Service-Time Division Duplex (UMTS-TDD), High Speed Packet Access (HSPA), Evolution Data Optimized (EVDO), Long Term Evolution-Advanced (LTE-Advanced), Multichannel Multipoint Distribution Service (MMDS), Fifth-Generation Wireless (5G), and so forth.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of, data-processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A dynamic random access memory (DRAM), comprising:
a first data bus that conveys a first type of data in a first direction with respect to the DRAM;
a first command and address bus that is associated with the first data bus;
a second data bus that conveys a second type of data in a second direction with respect to the DRAM, the second data bus being separate from the first data bus; and
a second command and address bus that is associated with the second data bus, the second command and address bus being separate from the first command and address bus.

2. The DRAM of claim 1, wherein the first type of data is write data, and the first direction with respect to the DRAM is toward the DRAM, and
wherein the second type of data is read data, and the second direction with respect to the DRAM is away from the DRAM.

3. The DRAM of claim 1, wherein the DRAM further comprises a first bank of memory and a second bank of memory,
wherein the first data bus comprises a first unidirectional bus and the second data bus comprises a second unidirectional bus, and
wherein the first data bus conveys the first type of data with respect to the first bank of memory simultaneously as the second data bus conveys the second type of data with respect to the second bank of memory.

4. The DRAM of claim 1, wherein the DRAM further comprises a first rank of memory and a second rank of memory, and
wherein the first data bus conveys the first type of data with respect to the first rank of memory simultaneously as the second data bus conveys the second type of data with respect to the second rank of memory.

5. The DRAM of claim 1, wherein the DRAM is embodied as a DRAM chip.

6. The DRAM of claim 1, wherein the DRAM is embodied as a DRAM module.

7. The DRAM of claim 6, wherein the DRAM module comprises a dual in-line memory module (DIMM).

8. A dynamic random access memory (DRAM), comprising:
a first rank of memory and a second rank of memory;
a first data bus that conveys a first type of data in a first direction with respect to the first rank of memory; and
a second data bus that conveys a second type of data in a second direction with respect to the second rank of memory, the second data bus being separate from the first data bus,
the first data bus conveying the first type of data with respect to the first rank of memory simultaneously as the second data bus conveys the second type of data with respect to the second rank of memory.

9. The DRAM of claim 8, further comprising:
a first command and address bus that is associated with the first data bus; and
a second command and address bus that is associated with the second data bus, the second command and address bus being separate from the first command and address bus.

10. The DRAM of claim 9, wherein the DRAM is embodied as a DRAM chip.

11. The DRAM of claim 9, wherein the DRAM is embodied as a DRAM module.

12. The DRAM of claim 11, wherein the DRAM module comprises a dual in-line memory module (DIMM).

13. A dynamic random access memory (DRAM), comprising:
a first bank of memory and a second bank of memory;
a first data bus that conveys a first type of data in a first direction with respect to the DRAM;

a first command and address bus that is associated with the first data bus;

a second data bus that conveys a second type of data in a second direction with respect to the DRAM, the second data bus being separate from the first data bus; and a second command and address bus that is associated with the second data bus, the second command and address bus being separate from the first command and address bus, the first data bus conveying the first type of data with respect to the first bank of memory simultaneously as the second data bus conveys the second type of data with respect to the second bank of memory.

14. The DRAM of claim 13, wherein the first type of data is write data, and the first direction with respect to the DRAM is toward the DRAM, and wherein the second type of data is read data, and the second direction with respect to the DRAM is away from the DRAM.

15. The DRAM of claim 14, wherein the first data bus comprises a first unidirectional data bus, and wherein the second data bus comprises a second unidirectional bus.

16. The DRAM of claim 15, wherein the DRAM is embodied as a DRAM chip.

17. The DRAM of claim 13, wherein the DRAM is embodied as a DRAM module.

18. The DRAM of claim 17, wherein the DRAM module comprises a dual in-line memory module (DIMM).

\* \* \* \* \*